June 7, 1966 H. V. HOLMES 3,254,897

TONE ARM

Filed July 8, 1963

INVENTOR.

HARLAND V. HOLMES

BY

Elliott & Pastoriza

ATTORNEYS 3,254,897
TONE ARM

Harland V. Holmes, 1950 Loganside Drive, Los Angeles 47, Calif.

Filed July 8, 1963, Ser. No. 293,537
6 Claims. (Cl. 274—23)

This invention relates to an improved tone arm for use with phonograph records and more particularly, an improved tone arm of high precision for both monophonic and stereophonic recordings.

Conventional record player tone arms are pivotally mounted so that the pick-up head swings in an arc from the periphery of the record towards the center of the record. Moreover, these tone arms are usually pivoted for vertical movement so that the needle describes a small arc in a vertical plane for up and down movements when following record grooves that are not absolutely level.

In the manufacture or recording of records however, a cutting stylus is mounted on a lathe structure and caused to travel in an absolutely straight line path from the periphery of the record in a radial direction to its center so that it follows a straight line bisecting the record. Further, the angle of the cutting stylus on the record is maintained consistent throughout its radial movement inwardly. As a consequence, when records manufactured in the foregoing manner are played with conventional play-back tone arms, there results what is known as a "tracking error." This tracking error may be defined, briefly, as any deviation of the play back needle from the path followed by the recording head stylus.

With the foregoing in mind, it is a primary object of this invention to provide an improved tone arm in which substantially no tracking error is present.

More particularly, it is an object to provide an improved tone arm in which the play back needle follows a straight line path across the surface of the record rather than in an arc as characterizes many prior art tone arms to the end that tracking error due to arcuate horizontal movement is avoided.

Another important object is to provide an improved tone arm in which the needle is adapted to move in an absolutely vertical up and down direction, rather than in an arcuate up and down direction so that any variations in depth of the groove will be followed accurately without changing the angle of the needle, to the end that tracking error resulting from vertical movement is avoided.

Another object is to provide an improved tone arm in which the needle pressure may be readily adjusted from approximately zero to ten or more grams.

Still another object is to provide an improved tone arm in which the overall height of the pick-up head and arm structure may be adjustable relative to the turn table to enable a given needle height above the turn table to be established.

Another important object is to provide an improved tone arm in which "skating" thrust is eliminated to the end that equal pressures on the record groove walls will be maintained at all times, and thus improve the balance fidelity of stereo play back.

Another object is to provide a tone arm which includes "queing" marks to enable a proper positioning of the needle preparatory to playing a given selection.

More general objects of this invention are to provide an improved tone arm meeting the foregoing objects which may be easily installed and aligned, is non-resonant, has a low mass and may be used with any conventional type play back cartridge.

Briefly, these and many other objects and advantages of this invention are attained by providing a straight rod terminating at one end in a pick-up head and having its other end adapted to be longitudinally slidably received within a base mounting structure. The arrangement is such that the rod and pick-up head is constrained to move in an absolutely straight radial line with respect to a record turn table, so that the path followed by the play back head coincides with a line bisecting the record. Further, the pick-up head itself comprises a casing incorporating a cartridge. This cartridge is mounted to the casing in a manner constraining it to a vertical movement only. The cartridge itself is counter-balanced so that the weight of the needle associated with the cartridge pressing on the record may be reduced to zero.

The rod structure and base mounting therefor include suitable means to prevent any twisting of the rod so that the angle of the needle in the groove is maintained consistent. In addition, the base mounting itself includes a simple vertical adjustment to vary the overall height of the rod and pick-up head with respect to the surfaces of the turn table.

The entire structure is relatively simple and easy to mount and install, there being required only a single opening in the turn table structure for mounting the base mounting, the pick-up head and remaining portions being cantilevered by the rod extending from the base mounting in proper position with respect to the turn table.

Since the pick-up head moves in a straight line path towards the center of the record, and the needle carrying cartridge itself is mounted for only vertical movement without any pivoting action within the pick-up head, the needle will track in exactly the same manner as the recording stylus in cutting the record to the end that tracking error is substantially eliminated and all of the attendant advantages resulting from the elimination of such tracking error are realized.

A better understanding of the invention will be had by now referring to one preferred embodiment thereof as illustrated in conjunction with the accompanying drawings, in which.

Figures 1, 2, 3, 4, 5, 6:
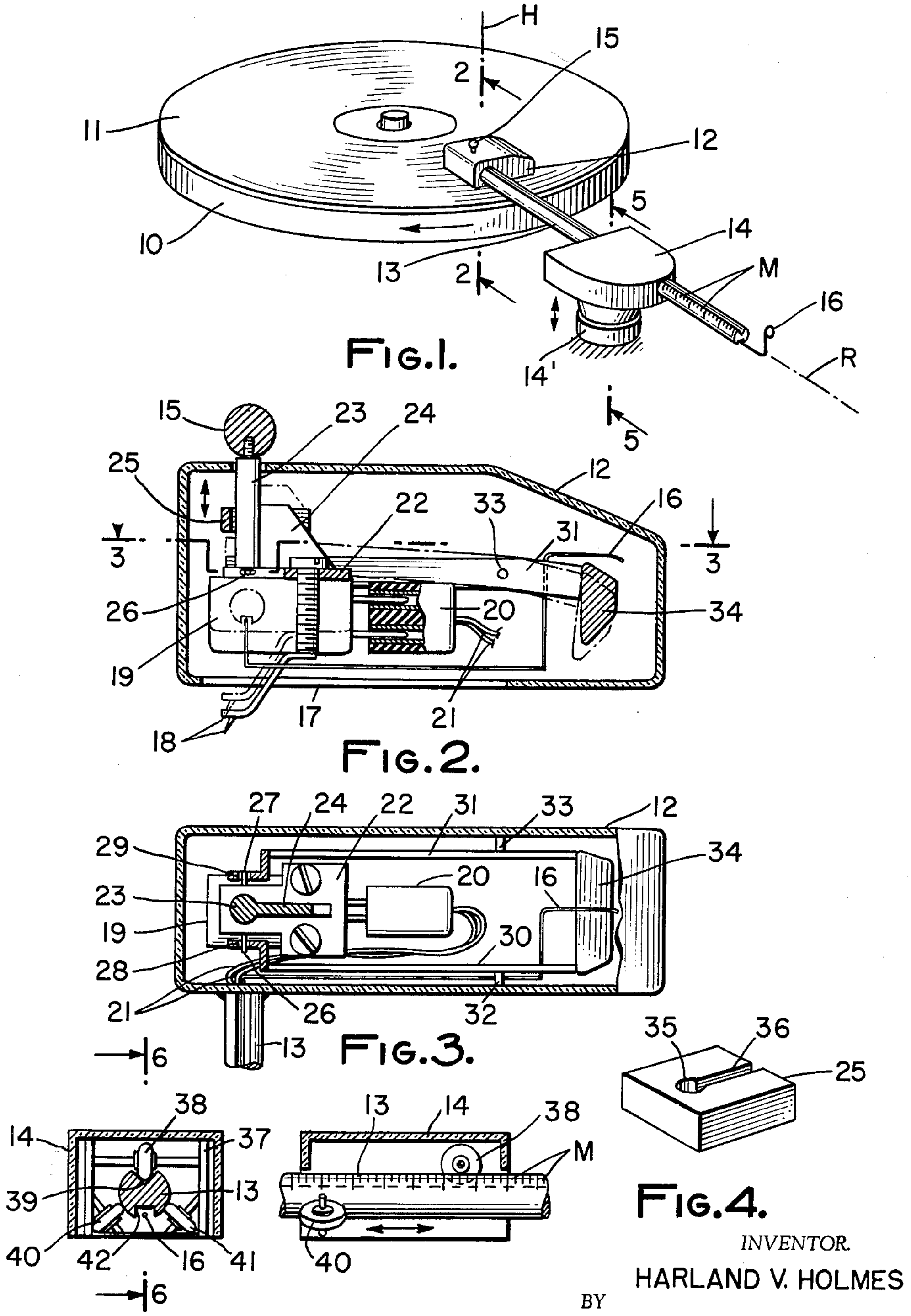
FIGURE 1 is a schematic perspective view of a turn table incorporating the tone arm of this invention.
FIGURE 2 is an enlarged cross-section partly cut away taken in the direction of the arrows 2—2 of FIGURE 1.
FIGURE 3 is another cross-section taken in the direction of the dashed line designated by the arrows 3—3 of FIGURE 2.
FIGURE 4 is a perspective view of one of the components employed in the structure illustrated in FIGURES 2 and 3.
FIGURE 5 is a cross-section of the base mounting taken in the direction of the arrows 5—5 of FIGURE 1; and, FIGURE 6 is a fragmentary cross-section taken in the direction of the arrows 6—6 of FIGURE 5.

Referring first to FIGURE 1, there is shown a phonograph turn table 10 with a record 11 positioned thereon. The improved tone arm of the present invention includes a pick-up head 12 secured to the end of a straight elongated rod 13. The other end of the rod 13 is longitudinally slidably received within a base mounting structure 14. The arrangement is such that the rod 13 may slide in the direction of the dashed line R which corresponds with a straight radial line passing from the periphery of the record 11 to the center thereof. Thus, the head 12 is held in cantilevered relationship by the rod 13 and can follow the grooves of the record 11 and track radially inwardly in an absolutely straight line. This movement of the pick-up head 12 corresponds to that of the recording stylus during the manufacture of the record 11.

As indicated in FIGURE 1, by the double headed arrow, the base mounting 14 may be raised or lowered as by a suitable screw knob 14' to vary the overall level of the rod 13 and the pick-up head 12 above the surface of the record 11.

As will become clearer as the description proceeds, there is provided a small weight 15 disposed above the pick-up head 12 which may be secured in position or replaced by a weight of different value to vary the pressure of the needle on the record. Further, there is also provided an elongated wirelike lever element, one end of which is shown protruding from the near end of the rod 13 as at 16 which serves to "cage" the needle or lift it from the surface of the record to a position within the pick-up head 12.

Referring to FIGURES 2 and 3, the pick-up head 12 comprises an outer casing having a lower opening 17 through which a needle 18 projects. As shown, this needle is supported by a cartridge 19 in turn carrying a socket 20 provided with electrical output leads 21. The mounting means for the cartridge takes the form of a T-plate 22 secured to the cartridge and including an upwardly vertically extending column 23. Associated with this column is a thin rib structure 24, the column 23 and rib 24 serving as guide means for vertical movement of the cartridge 19 within the pick-up head casing 12.

Guiding of the column 23 and rib 24 is achieved by a guide plate 25 rigidly secured in a stationary position to the inside of the pick-up head casing 12. The cartridge 19 itself is counter-balanced as will best be seen by reference to both FIGURES 2 and 3 by a counter-weight structure including lateral pins 26 and 27 extending from opposite sides of the T-plate receivable in slots 28 and 29 formed in the ends of arms 30 and 31. These arms are pivoted intermediate their ends at 32 and 33 to the casing 12 and terminate in a counter-weight 34. As a consequence of the slots 28 and 29 cooperating with the pins 26 and 27, the cartridge 19, column 23, and rib 24 may execute up and down movements in a perfectly straight vertical line even though the counter-balancing arm structure and weight move in a slight arc. This up and down movement is indicated by the double headed arrow in FIGURE 2 and by the dotted line representation of the cartridge when moved upwardly slightly.

In the absence of the small weight 15 threaded to the top of the column 23 as shown in FIGURE 2, the cartridge 19 is substantially balanced by the counter-weight 34 with respect to the pivot point 33 so that zero pressure of the needle 18 on the record is realized. By adding small weights in gradations to the upper end of the column 23, such as the weight 15, the pressure of the needle on the record 11 illustrated in FIGURE 1 may be adjusted.

FIGURE 4 shows in greater detail the guide plate 25 wherein it will be noted there is a smooth bore opening 35 and a slot 36 for receiving the column 23 and rib 24. Since the guide plate 25 is rigidly secured to the interior of the pick-up head casing 12, and since the column 23 and rib 24 fit within the bore 35 and slot 36 in this guide plate, it will be evident that the cartridge 19 is constrained to vertical movement.

In FIGURES 2 and 3, the other end of the lever element 16 is shown passing into the pick-up head casing 12 and extending to a position overhanging the weight 34. When the near end of this lever element, as illustrated in FIGURE 1, is rotated, it will bias down the end above the weight 34 thus moving the weight 34 downwardly to raise the needle from the record.

Referring now to FIGURE 5, the geometry of the rod 13 and the manner in which it is supported in the base mounting 14 will be evident. As shown, this base mounting 14 includes a frame structure 37 supporting an upper roller bearing 38 adapted to be received in a longitudinal V-shaped upper groove 39 formed in the rod 13. Also, the frame 37 supports lower side bearings 40 and 41 positioned forward of the upper roller 38; that is, in a position between the pick-up head 12 and the top roller 38 to provide the desired cantilevering support as clearly shown in FIGURE 6. The V-groove construction cooperating with the roller 38 prevents any twisting of the rod.

The underside of the rod 13 includes a channel 42 to accommodate the lever element 16. This same channel is used for the lead out conductors 21 from the cartridge.

From the double headed arrow illustrated in FIGURE 6, it will be evident that the rod 13 is free to slide longitudinally in a substantially frictionless manner within the base mounting 14.

The operation of the improved tone arm of this invention will be evident from the foregoing description. With the caging lever wire 16 rotated to the right to raise the needle such as illustrated in dotted lines in FIGURE 2, the pick-up head 12 may be positioned over the record 11 and the needle then dropped into the proper groove. This placement of the needle 18 in the groove is effected by rotating the lever element 16 in an opposite direction to remove the end of the element from the weight 34. Proper pressure of the needle is achieved by loading the end of the column 23 by a weight, such as weight 15 as described heretofore.

When the turn table is now started, the needle will track in the groove in a normal manner. Any variation in depth of this groove however will simply serve to raise and lower the needle and cartridge in a direct vertical line so that the angle of the stylus will remain consistent as a consequence of the fact that the cartridge is constrained for vertical movement only within the pick-up head casing 12. Further, as the spiral grooves progresses radially inwardly, the pick-up head 12 and the cartridge are free to follow the same as a consequence of the slidable mounting for the rod 13. In this respect, the inward tracking of the pick-up head will be in a straight line rather than an arcuate movement as characterizes pivotally mounted tone arms heretofore employed. Further, the longitudinal axis R of the rod and the vertical axis of the guide column 23 intersect at a point corresponding to the pivot axis of the projections 26 and 27, which point is exactly vertically above the needle end.

As a consequence of the straight line inward movement of the needle, any desired selection such as in the middle of a record may be played by providing suitable queing marks M on the rod 13 and prepositioning the rod in accordance with the correct queing mark prior to lowering the needle with the lever 16.

Thus, it will be evident that all of the errors and spurious signals resulting from poor tracking are eliminated by the instant invention. The structure itself is relatively simple and may be readily mounted for use with conventional turn tables as a substitute for the usually provided tone arm. Further, the T-plate mounting structure 22 for the cartridge 19 is such that it may receive any type of conventional cartridge, this T-plate constituting the sole support for the cartridge.

Minor changes that fall clearly within the scope and spirit of this invention will occur to those skilled in the art. The improved tone arm is therefore not to be thought of as limited to the exact structure set forth merely for illustrative purposes.

What is claimed is:

1. A tone arm comprising, in combination: a straight rod terminating at one end in a needle cartridge structure positioned so that said needle engages a record; a base mounting receiving the other end portion of said rod in longitudinal sliding relationship so that said one end of said rod is cantilevered from said base mounting whereby said cartridge can move radially inwardly as said record is rotated, and in which said needle cartridge structure includes a cartridge and needle; and means mounting said cartridge for vertical movement in a straight line path so that said needle can move up and down in a straight line path with respect to said record.

2. A tone arm according to claim 1, in which said base mounting includes means for preventing twisting of said rod and means for varying the overall height of said rod with respect to said record.

3. A tone arm comprising, in combination: a supporting rod; a pick-up head coupled to one end of said rod; a base mounting receiving the other end of said rod so that said pick-up head is cantilevered and can move back and forth in the longitudinal direction of said arm, and, in which said rod includes an upper V shaped groove, said base mounting including an upper roller bearing received in said groove and lower bearing means disposed between said upper roller bearing and said cartridge to engage the lower portions of said rod to cantilever the same and constrain the same against twisting movement.

4. A tone arm according to claim 3, in which said pick-up head includes means for mounting said cartridge for vertical up and down movement in a straight line path.

5. A tone arm according to claim 4, in which said rod includes queing marks so that said pick-up head may be positioned a predetermined distance from said base mounting.

6. A tone arm for use with a turn table and record rotated on said turn table comprising, in combination: a straight rod having an upper longitudinal V groove and a lower longitudinal channel; a pick-up head secured to one end of said rod; and a base mounting receiving the other end of said rod and adjustable in height, said base mounting including an upper roller bearing received in said groove and lower bearing means engaging lower side portions of said rod on opposite sides of said longitudinal channel at points spaced longitudinally closer than said upper roller bearing to said pick-up head so that said pick-up head is cantilevered in a position over said record and can move with said rod in a straight line motion radially with respect to said record, said pick-up head comprising a casing incorporating a needle cartridge; a guide means constraining movement of said needle cartridge to a vertical direction within said casing; a counter balance weight means in said casing including arms pivoted intermediate their ends to said casing and secured to a weight at first ends and coupled to said cartridge at their other ends; means for loading small weights on said cartridge to vary the downward pressure of the needle in said cartridge on said record; and caging means in the form of an elongated lever element passing along said lower channel in said rod to pass within said casing and engage said weight when actuated to lift said cartridge and needle upwardly.

References Cited by the Examiner

UNITED STATES PATENTS

| | | | |
|---|---|---|---|
| 893,292 | 7/1908 | Wlost | 274—23 |
| 2,604,326 | 7/1952 | Lynch | 274—23 |
| 2,869,877 | 1/1959 | Bard | 274—23 |
| 2,935,326 | 5/1960 | Grunwald | 274—23.1 |
| 3,139,284 | 6/1964 | Hammond | 274—24 |

NORTON ANSHER, *Primary Examiner.*

C. B. PRICE, *Assistant Examiner.*